United States Patent [19]

Winnik et al.

[11] Patent Number: 5,145,518
[45] Date of Patent: * Sep. 8, 1992

[54] INKS CONTAINING BLOCK COPOLYMER MICELLES

[75] Inventors: Francoise M. Winnik; Anthony R. Davidson, both of Toronto, Canada; John W-P. Lin, Webster, N.Y.; Melvin D. Croucher, Oakville, Canada

[73] Assignee: Xerox Corporation, Stamford, Conn.

[*] Notice: The portion of the term of this patent subsequent to Aug. 18, 2009 has been disclaimed.

[21] Appl. No.: 708,649

[22] Filed: May 30, 1991

Related U.S. Application Data

[63] Continuation-in-part of Ser. No. 544,564, Jun. 27, 1990.

[51] Int. Cl.$^5$ .............................................. C09D 11/00
[52] U.S. Cl. ...................................... 106/21; 106/20; 106/22; 106/23
[58] Field of Search ............................... 106/22; 8/647

[56] References Cited

U.S. PATENT DOCUMENTS

| | | | |
|---|---|---|---|
| 3,656,981 | 4/1972 | Beschke et al. | 106/491 |
| 3,784,502 | 1/1974 | Gobran | 260/33.6 PQ |
| 4,043,752 | 8/1977 | Kelmurry et al. | 8/527 |
| 4,153,587 | 5/1979 | Yui | 260/23 H |
| 4,267,310 | 5/1981 | Landell | 260/40 R |
| 4,308,327 | 12/1981 | Bird et al. | 430/15 |
| 4,543,308 | 9/1985 | Schumann et al. | 430/21 |
| 4,552,914 | 11/1985 | Sterling | 524/269 |
| 4,597,794 | 7/1986 | Ohta et al. | 106/20 |
| 4,664,708 | 5/1987 | Allen | 106/22 |
| 4,705,567 | 11/1987 | Hair et al. | 106/20 |
| 4,728,984 | 3/1988 | Daniele | 355/6 |
| 4,777,510 | 10/1988 | Russel | 355/7 |
| 4,877,451 | 10/1989 | Winnik et al. | 106/23 |

FOREIGN PATENT DOCUMENTS

| | | |
|---|---|---|
| 92578 | 9/1989 | European Pat. Off. |
| 54-053034 | 4/1979 | Japan |
| 55-137166 | 10/1980 | Japan |
| 56-155262 | 12/1981 | Japan |
| 7112489 | 9/1971 | Netherlands |

OTHER PUBLICATIONS

Xerox Disclosure Journal, "Copy Sheet Size and Weight Sensing", Robinson, Jr., Norman D., vol. 13, No. 4, Jul./Aug. 1988.
Ouellet, Christian et al., "Transient Networks in ABA Block Copolymer-Microemulsion Systems", Macromolecules 23 (13) 334752 (abstract).
Zhow, Zukany et al., "Anamalous association behavior of an ethylene oxide-propylene oxide ABA block copolymer in water", *Macromolecules* 20 (12), 3889-3891 (abstract).

*Primary Examiner*—William R. Dixon, Jr.
*Assistant Examiner*—Margaret V. Einsmann
*Attorney, Agent, or Firm*—Judith L. Byorick

[57] ABSTRACT

Disclosed is an ink composition which comprises an aqeuous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range. Optionally, silica is precipitated within the micelles. In a specific embodiment, the dye molecules are substantially colorless. In another specific embodiment, the ink also contains a colorant detectable in the visible wavelength range.

56 Claims, No Drawings

INKS CONTAINING BLOCK COPOLYMER MICELLES

This application is a continuation-in-part of copending application U.S. Ser. No. 07/544,564 filed Jun. 27, 1990 entitled "Inks Containing Colored Block Copolymer Micelles", the disclosure of which is totally incorporated herein by reference.

BACKGROUND OF THE INVENTION

The present invention is directed to ink compositions and printing processes. More specifically, the present invention is directed to ink compositions containing polymolecular micelles of a block copolymer having dye molecules attached to the micelle surfaces, and to printing processes employing said inks. One embodiment of the present invention is directed to an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. In another specific embodiment, the dye is selected so that the particles are detectable when exposed to radiation outside of the visible wavelength range. In yet another specific embodiment, the dye is selected so that the particles are substantially colorless and detectable when exposed to radiation outside of the visible wavelength range. The inks of the present invention are particularly suitable for ink jet printing processes.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777, 4,251,824, 4,410,899, 4,412,224, and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, compatibility with both coated/treated and plain papers, image edge acuity, reduced image feathering, and non-toxic and non-mutagenic properties.

Heterophase ink jet inks are known. For example, U.S. Pat. No. 4,705,567 discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, copending application U.S. Ser. No. 07/369,003, the disclosure of which is totally incorporated herein by reference, discloses ink jet inks and liquid developers containing colored particles comprising hydrophilic porous silica particles to the surfaces of which dyes are covalently bonded through silane coupling agents.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead, resulting in deterioration of the print quality.

Accordingly, there is a need for inks having the advantages of both dye-based inks and pigment-based inks. The present invention is directed to an ink composition which comprises a liquid vehicle and colored particles of an average diameter of 100 nanometers or less which comprises micelles of block copolymers of the formula ABA, wherein A represents a hydrophilic segment and B represents a hydrophobic segment, and wherein dye molecules are covalently attached to the micelles. Optionally, silica is precipitated within the micelles.

U.S. Pat. No. 4,552,914 (Sterling) discloses a thermoplastic elastomeric hydrocarbon block copolymer having 0.1 to 8 percent polysiloxane or silicone oil uniformly distributed throughout. The block copolymer may be styrene-ethylene-butylene-styrene in which the styrene blocks have a molecular weight of 5,000 to 40,000 and the ethylenebutylene block has a molecular weight of 20,000 to 500,000. The copolymer is combined with the silicone oil under the influence of a pressure of 1,500 to 2,500 p.s.i. such as provided by extrusion blending. The composition exhibits improved surface, elasticity, and tensile strength characteristics as well as superior processability.

U.S. Pat. No. 4,267,310 (Landoll) discloses a process for producing uniformly spherical particles of crystalline, normally solid condensation polymers by forming a dispersion of small liquid particles of the crystalline polymer in aprotic liquids containing 0.1 to 20 percent by weight of the polymer of a water-insoluble block or graft copolymer having at least one polymeric component which is soluble in the aprotic liquid and at least one other polymeric component which is insoluble in the aprotic liquid and associates with the crystalline polymer. The dispersion is cooled with agitation until the liquid particles solidfy, and the particles are then recovered.

U.S. Pat. No. 4,153,587 (Yui) discloses a modified propylene polymer containing mixed polymer composition characterized by high tensile strength, high elongation, and good bending stiffness. The material consists essentially of a crystalline polypropylene, a block copolymer wherein a propylene-ethylene random copolymer is chain-terminated onto the crystalline polypropylene, and a crystalline ethylene-propylene random copolymer having an ethylene content of more than about 90 percent by weight, wherein the modified polypropylene polymer is admixed with at least 30 percent by weight of an inorganic filler having an average particle size of less than 20 microns in diameter.

Copending application U.S. Ser. No. 07/636,264, entitled "Method of Storing Information Within a Reprographic System," with the named inventor Joseph D. Wright, the disclosure of which is totally incorporated herein by reference, discloses apparatuses and processes for controlling a reproduction system by scanning an image to detect at least one taggant in at least one marking material forming the image and issuing instructions to the reproduction system; the instructions cause the reproduction system to take an action selected from the group consisting of (a) prohibiting reproduction of those portions of the image formed by a marking material containing at least one predetermined detected taggant and reproducing all other portions of the image; (b) prohibiting reproduction of any part of the image upon detection of at least one predetermined taggant; (c) reproducing only those portions of the image formed by a marking material containing at least one predetermined taggant; (d) reproducing portions of the image formed by a marking material containing at least one predetermined taggant in a different manner from that in which the system reproduces portions of the image formed by a marking material not containing at least one predetermined taggant; and (e) identifying a source of the image on the basis of detection of at least one predetermined taggant.

Although known compositions are suitable for their intended purposes, a need remains for ink compositions exhibiting advantages of both dye-based inks and pigment-based inks. There is also a need for ink compositions with good waterfastness characteristics. A need also remains for ink compositions exhibiting good lightfastness characteristics. Further, there is a need for ink compositions that are non-toxic and non-mutagenic. In addition, a need exists for ink compositions for which a wide variety of color choices exists. There is also a need for ink compositions that can be prepared by simple and inexpensive processes. A need also exists for ink compositions which comprise stable particulate suspensions with long shelf life. Further, there is a need for ink compositions suitable for printing on plain papers, coated or treated papers, and transparency materials. In addition, there is a need for ink compositions that when printed on substrates exhibit good optical density, low feathering, and excellent rubresistance. There is also a need for ink compositions that when used to print on transparency materials generate images that project their original colors well when light is passed through the image. A need also remains for ink compositions with good thermal and oxidative stability. Further, there is a need for ink compositions suitable for ink jet printing that do not induce clogging of the printhead. A need also remains for ink compositions that when printed on substrates exhibit no undesirable intercolor bleeding between areas of different color. In addition, there is a need for ink compositions that are invisible to the human eye under normal viewing conditions but readable by a sensor, such as an infrared detector or a fluorescence detector, or by the human eye under special viewing conditions such as illumination of the image with ultraviolet light. There is also a need for ink compositions that are visible to the human eye under normal viewing conditions and are also readable by a sensor that detects wavelengths invisible to the human eye, such as an infrared detector or a fluorescence detector, or by the human eye under special viewing conditions such as illumination of the image with ultraviolet light. Further, there is a need for ink compositions that can provide a means for placing coded information on a document.

SUMMARY OF THE INVENTION

It is an object of the present invention to provide ink compositions exhibiting advantages of both dye-based inks and pigmentbased inks.

It is another object of the present invention to provide ink compositions with good waterfastness characteristics.

It is yet another object of the present invention to provide ink compositions exhibiting good lightfastness characteristics.

It is still another object of the present invention to provide ink compositions that are non-toxic and non-mutagenic.

Another object of the present invention is to provide ink compositions for which a wide variety of color choices exists.

Yet another object of the present invention is to provide ink compositions that can be prepared by simple and inexpensive processes.

Still another object of the present invention is to provide ink compositions which comprise stable particulate suspensions with long shelf life.

It is another object of the present invention to provide ink compositions suitable for printing on plain papers, coated or treated papers, and transparency materials.

It is yet another object of the present invention to provide ink compositions that when printed on substrates exhibit good optical density, low feathering, and excellent rub-resistance.

It is still another object of the present invention to provide ink compositions that when used to print on transparency materials generate images that project their original colors well when light is passed through the image.

Another object of the present invention is to provide ink compositions with good thermal and oxidative stability.

Yet another object of the present invention is to provide ink compositions suitable for ink jet printing that do not induce clogging of the printhead.

Still another object of the present invention is to provide ink compositions that when printed on substrates exhibit no undesirable intercolor bleeding between areas of different color.

It is another object of the present invention to provide ink compositions that are invisible to the human eye under normal viewing conditions but readable by a sensor, such as an infrared detector or a fluorescence detector, or by the human eye under special viewing conditions such as illumination of the image with ultraviolet light.

It is yet another object of the present invention to provide ink compositions that are visible to the human eye under normal viewing conditions and are also readable by a sensor that detects wavelengths invisible to the human eye, such as an infrared detector or a fluorescence detector under special viewing conditions such as illumination of the image with radiation at a wavelength that the detector is capable of sensing.

It is still another object of the present invention to provide ink compositions that can provide a means for placing coded information on a document.

These and other objects of the present invention can be achieved by providing an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the present invention, the particles comprise micelles of block copolymers of the formula ABA having silica precipitated therein and dye molecules covalently attached to the micelles. In another specific embodiment of the present invention, the dye is selected so that the particles are detectable when exposed to radiation outside the visible wavelength range. In yet another specific embodiment of the present invention, the dye is selected so that the particles are substantially colorless and detectable when exposed to radiation outside the visible wavelength range. Another embodiment of the present invention is directed to a printing process which comprises incorporating an ink of the present invention into an ink jet printing apparatus and causing droplets of the ink to be ejected in an imagewise pattern onto a substrate, thereby generating images on the substrate. Yet another embodiment of the present invention is directed to an ink preparation process which comprises, in the order stated (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming dyed polymeric micelles; and (4) admixing the dyed micelles with an aqueous liquid vehicle to form an ink composition. Still another embodiment of the present invention is directed to an ink preparation process which comprises, in the order stated (1) adding to water a block copolymer of the formula ABA, wherein A represents a hydrophilic segment and B represents a hydrophobic segment, thereby forming a dispersion of micelles of the block copolymer; (2) admixing a tetraalkoxysilane with the dispersion; (3) adding a water-soluble base to the dispersion, thereby bringing the pH of the dispersion to at least 8, thereby precipitating silica within the micelles; (4) adding to the dispersion a solution comprising water and a reactive dye capable of reacting with the block copolymer, thereby forming dyed polymeric micelles with silica precipitated therein; and (5) admixing the dyed micelles with an aqueous liquid vehicle to form an ink composition.

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). The liquid vehicle should permit an emulsion or a colloidal suspension of the colored particles in the ink, and should have evaporation characteristics allowing for the desired ink jet printing speed if the ink is to be used in an ink jet printing process. In the inks of the present invention, the liquid vehicle is generally present in an amount of from about 85 to about 99.5 percent by weight, and preferably from about 90 to about 99 percent by weight.

Optional additives to the inks prepared by the process of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, humectants such as ethylene glycol, diethyleneglycol, N-methylpyrollidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight, pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

The inks of the present invention contain polymeric micelles to which are attached dye molecules. The polymeric micelles comprise polymolecular aggregates, generally with an average diameter of about 100 nanometers or less, of a block copolymer. The block copolymer is of the ABA type, wherein the outer A segments are hydrophilic and the inner B segment is hydrophobic. The terms hydrophobic and hydrophilic as used herein are relative, in that the polymer contains two A segments and a B segment, wherein the A segments are hydrophilic with respect to the B segment. The A segments also exhibit good water solubility, typically being soluble in water in a concentration of at least about 0.2 grams per milliliter, while the B segment exhibits poor water solubility, typically being soluble in water in a concentration of no more than about 0.01 grams per milliliter. When dispersed in water at concentrations of, for example, from about 0.05 to about 10 grams per liter, the block copolymers form polymolecular micelles with a hydrophobic core and a hydrophilic shell, said micelles generally having an average diameter of 100 nanometers or less.

Examples of suitable monomers for the A block include oxyethylene monomers and aminoethylene monomers. The number of oxyethylene monomers per block typically is from about 5 to about 400 monomeric units, and preferably from about 50 to about 300 monomeric units.

Also suitable are vinyl carboxylic acids and their corresponding esters of the general formula:

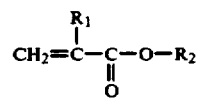

wherein $R_1$ and $R_2$ are independently selected from hydrogen and alkyl groups with from 1 to about 20 carbon atoms, including acrylic acid, methacrylic acid, paracarboxystyrene, and the like.

Also suitable are oxazolines of the general formula

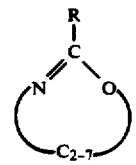

wherein R is hydrogen, an alkyl group with from 1 to about 6 carbon atoms, or benzyl and the ring has from about 2 to about 7 carbon atoms in addition to the carbon atom situated between the nitrogen and oxygen atoms, including ethyloxazoline, and the like.

Also suitable are acrylamides of the general formula

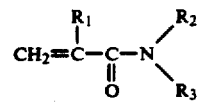

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, such as 2-hydroxyethyl, 2-hydroxypropyl, 3-hydroxypropyl, 2-hydroxybutyl, 3-hydroxybutyl, 4-hydroxybutyl, and the like, and amino-substituted alkyl groups, such as 2-aminoethyl, 2-aminopropyl, 3-aminopropyl, 2-aminobutyl, 3-aminobutyl, 4-aminobutyl, and the like.

Also suitable are vinyl ethers of the general formula

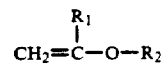

wherein $R_1$ is selected from the group consisting of hydrogen, methyl, and ethyl, and $R_2$ is selected from hydroxy-substituted alkyl groups, such as 2-hydroxyethyl, 2-hydroxypropyl, 3-hydroxypropyl, 2-hydroxybutyl, 3-hydroxybutyl, 4-hydroxybutyl, and the like, and amino-substituted alkyl groups, such as 2-aminoethyl, 2-aminopropyl, 3-aminopropyl, 2-aminobutyl, 3-aminobutyl, 4-aminobutyl, and the like. Mixtures of two or more monomers can also be employed in the hyrophilic block. In addition, the two A segments in the ABA block copolymer employed for the present invention need not be of identical composition, but can each be of different monomers, structure, and/or composition.

The molecular weight of each A segment or block is such that the segment is soluble in water. Typically, the molecular weight of each A segment is from about 500 to about 20,000 (weight average molecular weight), although the molecular weight can be outside of this range.

Examples of suitable monomers for the B block include oxypropylene monomers; the number of oxypropylene groups typically is from about 5 to about 100 monomeric units, and preferably from about 20 to about 60 monomeric units. Other suitable monomers for the B block include vinyl monomers, such as styrene, styrene derivatives and cogeners such as alkyl styrenes wherein the alkyl group has from 1 to about 20 carbon atoms, halogenated styrenes such as p-chlorostyrene, vinyl naphthalene, and the like, vinyl halides such as vinyl chloride, vinyl bromide, vinyl fluoride, and the like, vinyl ethers, such as methyl vinyl ether, vinyl ethyl ether, and the like, vinyl ketones, such as vinyl methyl ketone and the like, N-vinyl indole and N-vinyl pyrrolidone, vinyl esters, such as vinyl acetate, vinyl propionate, vinyl benzoate, and vinyl butyrate, and the like; acrylic monomers and esters of monocarboxylic acids, such as acrylates and alkylacrylates with the alkyl group having at least 1 carbon atom, and generally from about 1 to about 12 carbon atoms, such as methacrylates, methylacrylates, ethacrylates, ethylacrylates, and the like, including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, butyl methacrylate, and the like; acrylic monomers and esters of monocarboxylic acids, such as acrylates and alkylacrylates with the alkyl group having at least 1 carbon atom and 1 hydroxy group, and generally from about 2 to about 12 carbon atoms, such as 2-hydroxyethyl methacrylate, 2-hydroxyethyl acrylate, 3-hydroxypropyl methacrylate, 3-hydroxypropyl acrylate, 4-hydroxybutyl methacrylate, 4-hydroxybutyl acrylate, and the like; olefins, including monoolefins and polyolefins, such as ethylene, propylene, butylene, butadiene, isobutylene, cycloolefins, such as cyclopentene. The hydrophobic segment can also be derived by the condensation polymerization of difunctional monomers to yield polyesters, polyamides, polyurethanes, or the like, such as polyethyleneterephthalate, polyhexamethylene adipamide (nylon 6,6), or the like. Mixtures of two or more monomers can also be employed in the hydrophobic block.

The molecular weight of the B segment or block is such that the segment is insoluble in water. Typically, the molecular weight of the B segment is from about 500 to about 20,000 (weight average molecular weight), although the molecular weight can be outside of this range.

Examples of suitable ABA block copolymers for the present invention include Pluronic F-68, an ethylene oxide-propylene oxide-ethylene oxide block copolymer wherein the ethylene oxide blocks have an average molecular weight of 3340 and the propylene oxide block has an average molecular weight of 1750, available from BASF, Pluronic F-38, an ethylene oxide-propylene oxide-ethylene oxide block copolymer wherein the ethylene oxide blocks have an average molecular weight of 2000 and the propylene oxide block has an average molecular weight of 950, available from BASF, Pluronic F-88, an ethylene oxide-propylene oxide-ethylene oxide block copolymer wherein the ethylene oxide blocks have an average molecular weight of 4320 and the propylene oxide block has an average molecular weight of 3250, available from BASF, Pluronic F-98, an ethylene oxide-propylene oxide-ethylene oxide block copolymer wherein the ethylene oxide blocks have an average molecular weight of 5400 and the propylene oxide block has an average molecular weight of 2750 available from BASF, and Pluronic F-108, an ethylene oxide-propylene oxide-ethylene oxide block copolymer wherein the ethylene oxide blocks have an average molecular weight of 5600 and the propylene oxide block has an average molecular weight of 3250, available from BASF.

Other suitable ABA block copolymers for the present invention include amphiphilic block copolymers of vinyl ethers, prepared for example by living cationic polymerization, as described in M. Minoda, M. Sawamoto, and T. Higashimura, *Macromolecules*, 23, 1989, 1990, wherein the A blocks are 2-hydroxyethyl vinylether polymers of average molecular weight 2000 and the B block is a polymer of butyl vinyl ether of average molecular weight 1500. Other suitable ABA block copolymers for the present invention include block copolymers of ethylene oxide and 2-hydroxyethyl methacrylate, prepared for example as described in M. Ikemi, N. Odagiri, and I. Shinohara, *Polymer Journal*, 12, 777, 1980, wherein the ethylene oxide blocks have an average molecular weight of 7200 and the 2-hydroxyethyl methacrylate block has an average molecular weight of 1900.

To prepare the dyed polymeric micelles, the selected block copolymer is first admixed with water, preferably water that has been distilled or deionized. The block copolymer is added to the water in an amount sufficient to ensure micelle formation, and generally is added in a concentration of from about 0.05 percent by weight to about 5 percent by weight. The polymolecular micelles obtained are of an average diameter of about 100 nanometers or less. Subsequently, a water-soluble base, such as aqueous ammonium hydroxide, sodium hydroxide, organic amines such as methyl amine, ethyl amine, and propyl amine, or the like, is added to the dispersion of micelles in an amount sufficient to raise the pH of the dispersion to at least 8. Typically, the base is added to the dispersion in an amount of from about 5 to about 20 percent by weight of the total dispersion. A solution of a reactive dye dissolved in water typically at a concentration of from about 1 to about 10 percent by weight is then added to the dispersion, generally at room temperature, typically in an amount so that the dye molecules are present in an amount of from about 5 to about 30 percent by weight of the micelles. When the reaction between the dye and the polymeric micelles has completed (typically within about 24 hours), the mixture is purified by an ultrafiltration process using, for example, membranes with a molecular weight cut-off of 100,000 to remove excess reactive dye and other low molecular weight impurities. Subsequent to purification, the suspension of dyed micelles can be concentrated for use in an ink or isolated by freeze-drying.

In one specific embodiment of the present invention, the dyed polymeric micelles comprise a hydrophobic core and a hydrophilic shell, said micelles having silica precipitated therein, wherein dye molecules are attached to the micelle surfaces. The dyed micelles are prepared by first admixing to the selected block copolymer with water, preferably distilled or deionized water, generally in a concentration of from about 0.05 to about 5 percent by weight to obtain polymolecular micelles of an average diameter of about 100 nanometers or less. Subsequently, a tetraalkoxysilane wherein the alkyl group has from one to about 6 carbon atoms, such as tetraethoxysilane, is added to the dispersion of micelles, typically in a relative amount of from about 1 to about 30 percent by weight of micelles, and the dispersion is stirred until silica has precipitated into the micelles. Additional examples of suitable silane materials include tetramethoxysilane, tetra-n-propoxysilane, tetra-i-propoxysilane, tetra-n-butoxysilane, tetra-s-butoxysilane, tetra-i-butoxysilane, tetrapentoxysilane, tetrakis-(2-methoxyethoxysilane), and the like. Thereafter, a water soluble base, such as aqueous ammonium hydroxide, sodium hydroxide, organic amines such as for example methyl amine, ethyl amine, and propyl amine, or the like, is added to the dispersion of micelles in an amount sufficient to raise the pH of the dispersion to at least 8, and a solution of a reactive dye dissolved in water typically at a concentration of from about 1 to about 10 percent by weight is added to the dispersion, generally at room temperature, typically in an amount so that the dye molecules are present in an amount of from about 5 to about 30 percent by weight of the micelles. When the reaction between the dye and the polymeric micelles has completed (typically within about 24 hours), the mixture is purified by an ultrafiltration process using, for example, membranes with a molecular weight cut-off of 100,000 to remove excess reactive dye and other low molecular weight impurities. Subsequent to purification, the suspension of dyed micelles can be concentrated for use in an ink or isolated by freeze-drying. It is believed that the network of silica precipitated within the polymeric micelles enhances the properties of an ink containing the particles, particularly with respect to thermal stability.

The dyes suitable for the present invention generally include any of the Reactive Dyes capable of reacting with the block copolymer micelles to become attached thereto. These dyes typically comprise a chromophore soluble in water, such as an anthraquinone, a monoazo dye, or disazo dye, a phthalocyanine, an aza[18]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m-carboxypyridinium)-triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a $\beta$-chloroethylsulfone, a 4,5-dichloro-6-pyridazone, an $\alpha$-bromoacryloylamido, an $\alpha,\beta$-dibromopropionylamido, and the like. Examples of suitable dyes include Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like.

In a specific embodiment of the present invention, the dye is selected so that the polymeric particles are detectable when exposed to radiation outside the visible wavelength range. In another specific embodiment of the present invention, the dye is selected so that the polymeric particles are substantially colorless and detectable when exposed to radiation outside the visible wavelength range. For example, fluorescent or infrared-sensitive dyes can be used provided that they exhibit sufficient solubility in water to undergo the reaction with the polymeric micelles, they absorb light in a wavelength range other than the visible, such as infrared or ultraviolet, they emit light that is detectable by human eyes or that matches that of a suitable detector when exposed to a spectral range outside of the visible wavelength range, and they exhibit good thermal stability and light stability. In addition, in another specific embodiment of the present invention, the ink contains both a colorant visible to the human eye under normal conditions, such as a pigment, a dye, or particles wherein the covalently attached dye exhibits color in the visible wavelength range, and particles wherein the covalently attached dye is detectable when exposed to radiation outside the visible wavelength range. In this embodiment, the covalently attached dye can be either colored or substantially colorless. In the instance of substantially colorless dyes, suitable dyes or chromophores are distinguishable from the visible colorant in the ink under the conditions for viewing or detecting the ink containing substantially colorless particles. Examples of suitable fluorescent chromophores include dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid of the formula

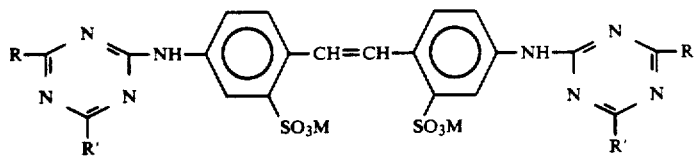

wherein R is an aromatic amine, an aliphatic amine, a hydroxyl group, an alkoxy group, an aryloxy group, a halogen atom, an aminoalcohol group, a sulfonated aromatic amine, or the like, R' is an aromatic amine, an aliphatic amine, a hydroxy group, an alkoxy group, an aryloxy group, a halogen atom, an aminoalcohol group, a sulfonated aromatic amine, or the like, M is hydrogen, a lithium ion, a sodium ion, a potassium ion, a cesium ion, a rubidium ion, an ammonium ion, or the like, and wherein the ratio of sulfonic acid functional group to stilbene moiety typically varies from about 1:1 to about 6:1, although the ratio can be outside of this range; unsymmetrical triazinyl derivatives of 4,4'-diaminostilbene-2,2'-disulfonic acid; amide derivatives of 4,4'-diaminostilbene-2,2'-disulfonic acid of the formula

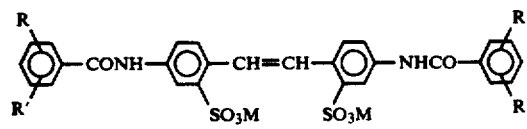

wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and wherein the ratio of sulfonic acid group to aminostilbene typically is from about 2:1 to about 4:1, although the ratio can be outside of this range; phenylurea derivatives of 4,4'-disubstituted stilbene-2,2'-disulfonic acid of the formula

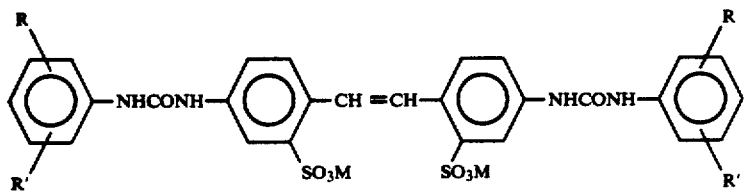

wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and the ratio of sulfonic acid group to aminostilbene typically is from about 2:1 to about 4:1, although the ratio can be outside of this range; mono- or di-naphthyl-triazole derivatives of 4,4'-disubstituted stilbene disulfonic acid of the formula

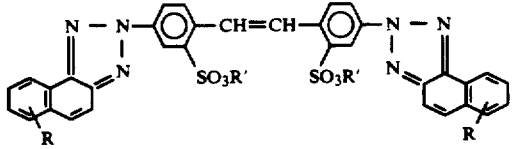

wherein R is hydrogen or SO₃R', wherein R' is hydrogen, a lithium ion, a sodium ion, a potassium ion, a cesium ion, a rubidium ion, an ammonium ion, or the like, and wherein the ratio of sulfonic acid group to aminostilbene is typically from about 2:1 to about 4:1, although the ratio can be outside of this range; derivatives of benzithiazole; derivatives of benzoxazole; derivatives of benziminazole; derivatives of coumarin; derivatives of pyrazolines containing sulfonic acid groups, 4,4'-bis(triazin-2-ylamino)stilbene-2,2'-disulfonic acids; 2-(stilben-4-yl)naphthotriazoles; 2-(4-phenylstilben-4-yl)benzoxazoles; 4,4-bis(triazo-2-yl)stilbene-2,2'-disulfonic acids; 1,4-bis(styryl)biphenyls; 1,3-diphenyl-2-pyrazolines; bis(benzazol-2-yl) derivatives, 3-phenyl-7-(triazin-2-yl)coumarins; carbostyrils; naphthalimides; 3,7-diaminodibenzothiophen-2,8-disulfonic acid-5,5-dioxide; other commercially available materials, such as C.I. Fluorescent Brightener No. 28(C.I. 40622), the fluorescent series Leucophor B-302, BMB (C.I. 290), BCR, BS, and the like (available from Leucophor); fluorescent brighteners as shown in the Colour Index, volume 2, 3rd edition, (society of Dyers and Colourists); and the like. Additional examples of suitable chromophores that absorb in the infrared region include commercially available materials such as the Pro-Jet IR series of materials, available from ICI FIne Chemicals Division, as well as other infrared absorbing materials available from, for example, Eastman Kodak Company, Rochester, N.Y. and Lambda Physics Inc., Bedford, Mass.

Also suitable are the following infrared-sensitive dye structures:

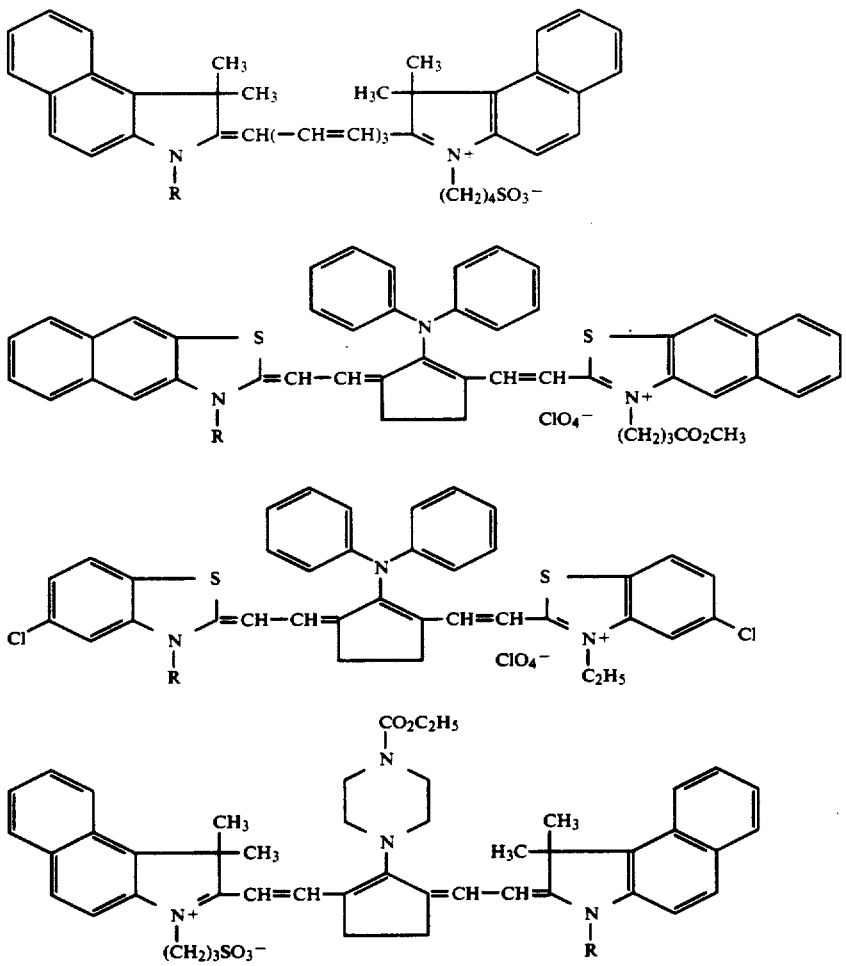

wherein R can be any of the following groups:

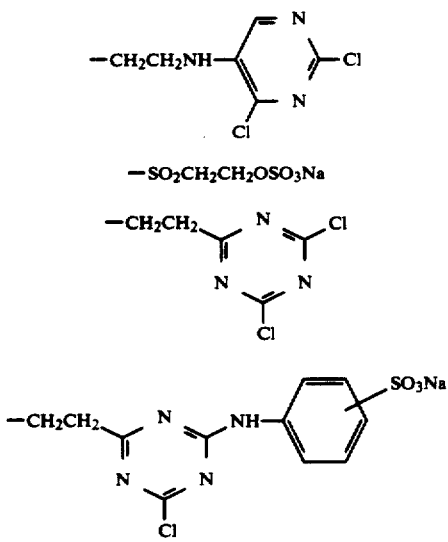

Most of the dyes with these structures are colored and thus are best suited for inks wherein the particles are both visibly colored and detectable when exposed to radiation outside the visible wavelength range.

The dyed polymeric micelles can have dye molecules attached to the micelle surfaces in any amount sufficient to impart to the micelles the desired intensity and hue of color. Typically, the dyed micelles contain the dye in an amount of from about 0.03 to about 20 percent by weight, preferably from about 2 to about 5 percent by weight. When the block copolymer micelles have silica dispersed therein, the dyed micelles typically comprise from about 60 to about 98 percent by weight of the block copolymer, from about 1.5 to about 39.5 percent by weight of silica, and from about 0.5 to about 20 percent by weight of the dye.

Within the ink composition, the dyed polymeric micelles are present in any effective amount to achieve the desired degree of coloration. Typically, the micelles are present in an amount of from about 0.5 to about 15 percent by weight, and preferably from about 1 to about 6 percent by weight.

The small particle size of the dyed polymeric micelles contained in the inks of the present invention enable ink compositions having many advantages of heterophase inks, such as waterfastness, lightfastness, image density, thermal stability, oxidative stability, compatibility with both coated/treated and plain papers as well as transparency materials, image edge acuity, reduced image feathering, and non-toxic and non-mutagenic properties, as well as many advantages of dye-based inks, such as transparency, stability, and long shelf life. In addition, since the particles typically are in the range of from about 10 nanometers to about 100 nanometers in diameter, they do not induce clogging of the printhead in an ink jet printer. Further, the dye molecules covalently bound to the polymeric micelles generally carry ionic charges and impart stability to the particles in aqueous media via electrostatic forces. Additionally, the particulate nature of the inks and the high affinity for paper of many hydrophilic materials suitable for the A segments of the block copolymers contained in the inks, such as polyethylene oxide, further enhances the waterfastness and rub-resistance of prints made with the inks of the present invention. Inks of the present invention that are substantially colorless and detectable when exposed to radiation outside the visible wavelength range are also useful in processes wherein it is desired to place invisible markings on documents; examples of such situations include providing security markings to control the number of copies made of a document, providing invisible markings that can be detected by an imaging device and that provide instructions to the imaging device (such as instructions not to copy certain portions of the document or to alter the color of certain portions of the document), identifying the machine with which the original document was made, or the like. In addition, inks of the present invention that contain both a visible colorant, such as a pigment or a dye or visibly colored polymeric micelles, and polymeric micelles that are detectable when exposed to radiation outside the visible wavelength range can, for example, be used to identify the source of a particular ink or to provide instructions to an imaging device capable of detecting the invisible particles. Examples of apparatuses and processes in which inks containing dyes that are detectable in a wavelength range outside the visible range are disclosed in copending application U.S. Ser. No. 07/636,264, the disclosure of which is totally incorporated herein by reference. Further, particles can have covalently attached thereto two or more different dyes that are visible in other wavelength regions, rendering them readable by different sensors.

Ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Any ink jet apparatus may be employed to generate images with the ink compositions disclosed herein, such as the Diablo C150 IJ printer, the Hewlett Packard Desk Jet printer, the Diablo C150 TIJ printer, or the like. Particularly preferred is a thermal ink jet printing apparatus. The inks prepared by the process of the present invention can be used to form images on a wide variety of substrates, including plain paper such as Xerox ® 4024 paper, bond paper such as Gilbert 25 percent cotton bond paper or Gilbert 100 percent cotton bond paper, silica coated papers, transparency materials, fabrics, plastics, polymeric films, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Cyan Ink

An ink composition was prepared as follows. To 91 milliliters of deionized water was added 1.64 grams of a polyethylene oxide-polypropylene oxide-polyethylene oxide block copolymer (Pluronic F-68, obtained from BASF) and the resulting dispersion was stirred at room temperature for 2 hours. Thereafter, 9.02 milliliters of 11.09 Molar aqueous ammonium hydroxide was added to the dispersion and the mixture was stirred for an additional hour at room temperature. Subsequently, a solution of 2.0 grams of Procion Turquoise H-7G dye (obtained from ICI) dissolved in 25 milliliters of water was added to the dispersion, and the mixture was stirred overnight at room temperature. The dispersion of colored polymeric micelles thus prepared was then diluted to 500 milliliters by the addition of deionized water and the excess unreacted dye was removed by ultrafiltration (Minitan System, available from Millipore, equipped with 2 100K polysulfone membranes). The purified suspension of cyan colored polymeric micelles was then concentrated to 85 milliliters by solvent evaporation in a Rotary evaporator under reduced pressure.

To this purified concentrated suspension of cyan colored polymeric micelles were then added 3.7 milliliters of ethylene glycol to form a cyan colored ink composition. The cyan ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation), on silica coated paper (obtained from Jujo), and on transparency material (3R3351, obtained from Xerox Corporation). In each instance, the cyan prints obtained exhibited solid areas of acceptable optical density (1.14 on coated paper, 0.97 on 4024 paper/felt side, 1.00 on 4024 paper/wire side, and 0.95 on transparency). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.00 and the optical density of the sheet soaked in water for 2 minutes was 0.80. No clogging of the printhead was observed during the extensive print tests.

EXAMPLE II

Cyan Silicated Ink

An ink composition was prepared as follows. To 500 milliliters of deionized water was added 4.08 grams of a polyethylene oxide-polypropylene oxide-polyethylene oxide block copolymer (Pluronic F-68, obtained from BASF) and the resulting dispersion was stirred at room temperature for 2 hours. Subsequently, 1.04 milliliters of tetraethoxysilane (obtained from Aldrich Chemical Corporation) was added to the dispersion and the mixture was stirred vigorously with a magnetic stirrer for 1 hour. Thereafter, 22.5 milliliters of 11.09 Molar aqueous ammonium hydroxide was added to the dispersion and the mixture was stirred for one hour at room temperature. A solution of 2.0 grams of Procion Turquoise H-7G dye (obtained from ICI) dissolved in 25 milliliters of water was then added to 100 milliliters of the dispersion of silicated micelles, and the mixture was stirred overnight at room temperature. The excess unreacted dye was then removed from the dispersion of colored silicated polymeric micelles by ultrafiltration (Minitan System, available from Millipore, equipped with 2 100K polysulfone membranes). The purified suspension of cyan colored polymeric micelles was then concentrated to 100 milliliters by evaporation of the solvent in a Rotary evaporator at a reduced pressure of about 20 mm Hg. The particle size as determined by Transmission Electron Microscopy (TEM) was about 20 nanometers. The particle size prior to addition of the dye as determined by TEM was about 20 nanometers, indicating that coloration of the particles does not affect their size as determined within the limitations of the measurement technique.

Subsequently, 50 milliliters of the purified suspension of cyan colored polymeric micelles was concentrated to a volume of 9 milliliters under a reduced pressure of approximately 20 mm Hg by use of a Rotary evaporator. To this darkly colored cyan suspension were then added 2.42 milliliters of ethylene glycol and 4.1 milliliters of water to form a cyan colored ink composition.

The cyan ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation) and on silica coated paper (obtained from Jujo). In each instance, the cyan prints obtained exhibited solid areas of acceptable optical density (1.37 on coated paper, 0.98 on 4024 paper/felt side, and 0.94 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 0.94 and the optical density of the sheet soaked in water for 2 minutes was 0.80. No clogging of the printhead was observed during the extensive print tests.

EXAMPLE III

Yellow Ink

An ink composition was prepared as follows. To 91 milliliters of deionized water was added 1.64 grams of a polyethylene oxide-polypropylene oxide-polyethylene oxide block copolymer (Pluronic F-68, obtained from BASF) and the resulting dispersion was stirred at room temperature for 2 hours. Thereafter, 9.02 milliliters of 11.09 Molar aqueous ammonium hydroxide was added to the dispersion and the mixture was stirred for an additional hour at room temperature. Subsequently, a solution of 4.0 grams of Procion Yellow MX-8G dye (obtained from ICI) dissolved in 25 milliliters of water was added to the dispersion, and the mixture was stirred overnight at room temperature. The dispersion of colored polymeric micelles thus prepared was then diluted to 500 milliliters by the addition of deionized water and the excess unreacted dye was removed by ultrafiltration (Minitan System, available from Millipore, equipped with 2 100K polysulfone membranes). The purified suspension of yellow colored polymeric micelles was then concentrated to 85 milliliters by solvent evaporation in a Rotary evaporator under reduced pressure.

To this purified concentrated suspension of suspension of yellow colored polymeric micelles were then added 3.7 milliliters of ethylene glycol to form a yellow colored ink composition. The yellow ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation), on silica coated paper (obtained from Jujo), and on transparency material (3R3351, obtained from Xerox Corporation). In each instance, the yellow prints obtained exhibited solid areas of acceptable optical density (0.84 on coated paper, 0.66 on 4024 paper/felt side, 0.65 on 4024 paper/wire side, and 0.58 on transparency). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 0.84 and the optical density of the sheet soaked in water for 2 minutes was 0.71. No clogging of the printhead was observed during the extensive print tests.

EXAMPLE IV

Magenta Silicated Ink

An ink composition was prepared as follows. To 500 milliliters of deionized water was added 4.08 grams of a polyethylene oxide-polypropylene oxide-polyethylene oxide block copolymer (Pluronic F-68, obtained from BASF) and the resulting dispersion was stirred at room temperature for 2 hours. Subsequently, 1.04 milliliters of tetraethoxysilane (obtained from Aldrich Chemical Corporation) was added to the dispersion and the mixture was stirred vigorously with a magnetic stirrer for 1 hour. Thereafter, 22.5 milliliters of 11.09 Molar aqueous ammonium hydroxide was added to the dispersion and the mixture was stirred for one hour at room temperature. A solution of 3.0 grams of Levafix Brilliant Red EGBA dye (obtained from Bayer) dissolved in 25 milliliters of water was then added to 100 milliliters of the dispersion of silicated micelles, and the mixture was stirred overnight at room temperature. The excess unreacted dye was then removed from the dispersion of colored silicated polymeric micelles by ultrafiltration (Minitan System, available from Millipore, equipped with 2 100K polysulfone membranes). The purified suspension of magenta colored polymeric micelles was then concentrated to 100 milliliters by evaporation of the solvent in a Rotary evaporator at a reduced pressure of about 20 mm Hg. The particle size as determined by Transmission Electron Microscopy (TEM) was about 20 nm. The particle size prior to addition of the dye as determined by TEM was about 20 nm, indicating that coloration of the particles does not affect their size as determined within the limitations of the measurement technique.

Subsequently, 50 milliliters of the purified suspension of magenta colored polymeric micelles was concentrated to a volume of 9 milliliters under a reduced pressure of approximately 20 mm Hg by use of a Rotary evaporator. To this darkly colored magenta suspension were then added 2.42 milliliters of ethylene glycol and 4.1 milliliters of water to form a magenta colored ink composition.

The magenta ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation) and on silica coated paper (obtained from Jujo). In each instance, the magenta prints obtained exhibited solid areas of acceptable optical density (1.02 on coated paper, 0.86 on 4024 paper/felt side, and 0.92 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 0.92 and the optical density of the sheet soaked in water for 2 minutes was 0.78. No clogging of the printhead was observed during the extensive print tests.

EXAMPLE V

Black Silicated Ink

An ink composition was prepared as follows. To 500 milliliters of deionized water was added 4.08 grams of a polyethylene oxide-polypropylene oxide-polyethylene oxide block copolymer (Pluronic F-68, obtained from BASF) and the resulting dispersion was stirred at room temperature for 2 hours. Subsequently, 1.04 milliliters of tetraethoxysilane (obtained from Aldrich Chemical Corporation) was added to the dispersion and the mixture was stirred vigorously with a magnetic stirrer for 1 hour. Thereafter, 22.5 milliliters of 11.09 Molar aqueous ammonium hydroxide was added to the dispersion and the mixture was stirred for one hour at room temperature. A solution of 2.0 grams of Duasyn Black RL-SF dye (obtained from Hoechst) dissolved in 25 milliliters of water was then added to 100 milliliters of the dispersion of silicated micelles, and the mixture was stirred overnight at room temperature. The excess unreacted dye was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The particle size as determined by Transmission Electron Microscopy (TEM) was about 20 nanometers. The particle size prior to addition of the dye as determined by TEM was about 20 nanometers, indicating that coloration of the particles does not affect their size as determined within the limitations of the measurement technique.

Subsequently, 50 milliliters of the purified suspension of black colored polymeric micelles was concentrated to a volume of 9 milliliters under a reduced pressure of approximately 20 mm Hg by use of a Rotary evaporator. To this black suspension were then added 2.42 milliliters of ethylene glycol and 4.1 milliliters of water to form a black colored ink composition.

The black ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation), and on silica coated paper (obtained from Jujo). In each instance, the black prints obtained exhibited solid areas of acceptable optical density (1.22 on coated paper, 1.02 on 4024 paper/felt side, and 0.98 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.22 and the optical density of the sheet soaked in water for 2 minutes was 1.04. No clogging of the printhead was observed during the extensive print tests.

EXAMPLE VI

Black Silicated Ink

An ink composition was prepared as follows. To 675 milliliters of deionized water was added 12.2 grams of a polyethylene oxide-polypropylene oxide-polyethylene oxide block copolymer (Pluronic F-38, obtained from BASF) and the resulting dispersion was stirred at room temperature for 2 hours. Subsequently, 3.1 milliliters of tetraethoxysilane (obtained from Aldrich Chemical Corporation) was added to the dispersion and the mixture was stirred vigorously with a magnetic stirrer for 1 hour. Thereafter, 67.5 milliliters of 10.89 Molar aqueous ammonium hydroxide was added to the dispersion and the mixture was stirred for one hour at room temperature. A solution of 1.04 grams of Basilen PBR Black RL-SF dye (obtained from BASF) dissolved in 25 milliliters of water was then added to 100 milliliters of the dispersion of silicated micelles, and the mixture was stirred overnight at room temperature. The excess unreacted dye was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The concentrated suspension was freeze dried to yield 0.8 gram of a black powder. The particle size as determined by Transmission Electron Microscopy (TEM) was about 80 nanometers.

Subsequently, a black ink composition was prepared by suspending the sonication for 2 minutes in an ultrasonic bath 0.5 gram of this black into a solution made of 25 milliliters of water and 4 milliliters of ethylene glycol to form a black colored ink composition.

The black ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation), and on silica coated paper (obtained from Jujo). In each instance, the black prints obtained exhibited solid areas of acceptable optical density (1.42 on coated paper, 1.25 on 4024 paper/felt side, and 0.88 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.42 and the optical density of the sheet soaked in water for 2 minutes was 1.14. No clogging of the printhead was observed during the extensive print tests.

EXAMPLE VII

Black Silicated Ink

An ink composition was prepared as follows. To 675 milliliters of deionized water was added 12.2 grams of a polyethylene oxide-polypropylene oxide-polyethylene oxide block copolymer (Pluronic F-108, obtained from BASF) and the resulting dispersion was stirred at room temperature for 2 hours. Subsequently, 3.1 milliliters of tetraethoxysilane (obtained from Aldrich Chemical Corporation) was added to the dispersion and the mixture was stirred vigorously with a magnetic stirrer for 1 hour. Thereafter, 67.5 milliliters of 10.89 Molar aqueous ammonium hydroxide was added to the dispersion and the mixture was stirred for one hour at room temperature. A solution of 1.04 grams of Basilen PBR Black RL-SF dye (obtained from BASF) dissolved in 25 milliliters of water was then added to 100 milliliters of the dispersion of silicated micelles, and the mixture was stirred overnight at room temperature. The excess unreacted dye was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The concentrated suspension was freeze-dried to yield 0.68 gram of a black powder. The particle size as determined by Transmission Electron Microscopy (TEM) was about 30 nanometers.

Subsequently a black ink composition was prepared by suspending by sonication for 2 minutes in an ultrasonic bath 0.5 gram of this black powder into a solution made of 25 milliliters of water and 4 milliliters of ethylene glycol to form a black colored ink composition.

The black ink thus prepared was incorporated into a cleaned Hewlett Packard ink cartridge and jetted with a Hewlett Packard Desk Jet ink jet printer. Prints were formed on plain paper (Xerox® 4024 (#19) paper, obtained from Xerox Corporation), and on silica coated paper (obtained from Jujo). In each instance, the black prints obtained exhibited solid areas of acceptable optical density (1.36 on coated paper, 1.15 on 4024 paper/felt side, and 0.98 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.36 and the optical density of the sheet soaked in water for 2 minutes was 1.31. No clogging of the printhead was observed during the extensive print tests.

EXAMPLE VIII

Black Silicated Ink

An ink composition was prepared as follows. To 675 milliliters of deionized water was added 12.2 grams of a polyethylene oxide-polypropylene oxide-polyethylene oxide block copolymer (Pluronic F-127, obtained from BASF) and the resulting dispersion was stirred at room temperature for 2 hours. Subsequently, 3.1 milliliters of tetraethoxysilane (obtained from Aldrich Chemical Corporation) was added to the dispersion and the mixture was stirred vigorously with a magnetic stirrer for 1 hour. Thereafter, 67.5 milliliters of 10.89 Molar aqueous ammonium hydroxide was added to the dispersion and the mixture was stirred for one hour at room temperature. A solution of 1.04 grams of Basilen PBR Black RL-SF dye (obtained from BASF) dissolved in 25 milliliters of water was then added to 100 milliliters of the dispersion of silicated micelles, and the mixture was stirred overnight at room temperature. The excess unreacted dye was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The concentrated suspension was freeze-dried to yield 0.75 gram of a black powder. The particle size as determined by Transmission Electron Microscopy (TEM) was about 70 nanometers.

Subsequently, a black ink composition was prepared by suspending by sonication for 2 minutes in an ultrasonic bath 0.5 gram of this black powder into a solution made of 25 milliliters of water and 4 milliliters of ethylene glycol to form a black colored ink composition.

The black ink thus prepared was incorporated into a cleaned Hewlett Packard ink cartridge and jetted with a Hewlett Packard Desk Jet ink jet printer. Prints were formed on plain paper (Xerox® 4024 (#19) paper, obtained from Xerox Corporation), and on silica coated paper (obtained from Jujo). In each instance, the black prints obtained exhibited solid areas of acceptable optical density (1.16 on coated paper, 1.25 on 4024 paper/felt side, and 1.08 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.16 and the optical density of the sheet soaked in water for 2 minutes was 1.01. No clogging of the printhead was observed during the extensive print tests.

EXAMPLE IX

Black Silicated Ink

An ink composition was prepared as follows. To 675 milliliters of deionized water was added 12.2 grams of a polyethylene oxide-polypropylene oxide-polyethylene oxide block copolymer (Pluronic F-68, obtained from BASF) and the resulting dispersion was stirred at room temperature for 2 hours. Subsequently, 3.1 milliliters of tetraethoxysilane (obtained from Aldrich Chemical Corporation) was added to the dispersion and the mixture was stirred vigorously with a magnetic stirrer for 1 hour. Thereafter, 67.5 milliliters of 10.89 Molar aqueous ammonium hydroxide was added to the dispersion and the mixture was stirred for one hour at room temperature. A solution of 1.10 grams of Basilen PBR Black RL-SF dye (obtained from BASF) and of 0.90 gram of Reactive Orange 16 dye (obtained from Aldrich Chemical Corporation) dissolved in 50 milliliters of water was then added to 200 milliliters of the dispersion of silicated micelles, and the mixture was stirred overnight at room temperature. The excess unreacted dyes was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The concentrated suspension was freeze-dried to yield 0.75 gram of a deeply black powder. The particle size as determined by Transmission Electron Microscopy (TEM) was about 25 nanometers.

Subsequently, a black ink composition was prepared by suspending by sonication for 2 minutes in an ultrasonic bath 0.5 gram of this black powder into a solution made of 25 milliliters of water and 4 milliliters of ethylene glycol to form a black colored ink composition.

The black ink thus prepared was incorporated into a cleaned Hewlett Packard ink cartridge and jetted with a Hewlett Packard Desk Jet ink jet printer. Prints were formed on plain paper (Xerox® 4024 (#19) paper, obtained from Xerox Corporation), and on silica coated paper (obtained from Jujo). In each instance, the black prints obtained exhibited solid areas of acceptable optical density (1.54 on coated paper, 1.48 on 4024 paper/felt side, and 1.38 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.46 and the optical density of the sheet soaked in water for 2 minutes was 1.31. No clogging of the printhead was observed during the extensive print tests.

EXAMPLE X

Black Silicated Ink

An ink composition was prepared as follows. To 675 milliliters of deionized water was added 12.2 grams of a polyethylene oxide-polypropylene oxide-polyethylene oxide block copolymer (Pluronic F-68, obtained from BASF) and the resulting dispersion was stirred at room temperature for 2 hours. Subsequently, 3.1 milliliters of tetraethoxysilane (obtained from Aldrich Chemical Corporation) was added to the dispersion and the mixture was stirred vigorously with a magnetic stirrer for 1 hour. Thereafter, 67.5 milliliters of 10.89 Molar aqueous ammonium hydroxide was added to the dispersion and the mixture was stirred for one hour at room temperature. A solution of 2.0 grams of Basilen PBR Black RL-SF dye (obtained from BASF) dissolved in 50 milliliters of water was then added to 100 milliliters of the dispersion of silicated micelles, and the mixture was stirred overnight at room temperature. The excess unreacted dye was then removed from the dispersion of black silicated polymeric micelles by ultrafiltration (Minitan System, available from Millipore, equipped with 2 100K polysulfone membranes). The purified suspension of black colored polymeric micelles was then concentrated to 100 milliliters by evaporation of the solvent in a Rotary evaporator at a reduced pressure of about 20 mm Hg. The concentrated suspension was freeze-dried to yield 0.83 gram of a deeply black powder. The particle size as determined by Transmission Electron Microscopy (TEM) was about 25 nanometers.

A solution of 2.0 grams of Reactive Orange dye (obtained from Aldrich Chemical Corporation) dissolved in 50 milliliters of water was then added to 100 milliliters of the dispersion of silicated micelles, and the mixture was stirred overnight at room temperature. The excess unreacted dye was then removed from the dispersion of orange silicated polymeric micelles by ultrafiltration (Minitan System, available from Millipore, equipped with 2 100K polysulfone membranes). The purified suspension of orange colored polymeric micelles was then concentrated to 100 milliliters by evaporation of the solvent in a Rotary evaporator at a reduced pressure of about 20 mm Hg. The concentrated suspension was freeze-dried to yield 0.68 gram of an orange powder. The particle size as determined by Transmission Electron Microscopy (TEM) was about 25 nanometers.

Subsequently, a black ink composition was prepared by suspending by sonication for 2 minutes in an ultrasonic bath 0.25 gram of the black powder and 0.30 gram of the orange powder into a solution made of 25 milliliters of water and 4 milliliters of ethylene glycol to form a deeply black colored ink composition.

The black ink thus prepared was incorporated into a cleaned Hewlett Packard ink cartridge and jetted with a Hewlett Packard Desk Jet ink jet printer. Prints were formed on plain paper (Xerox® 4024 (#19) paper, obtained from Xerox Corporation), and on silica coated paper (obtained from Jujo). In each instance, the black prints obtained exhibited solid areas of acceptable optical density (1.52 on coated paper, 1.44 on 4024 paper/felt side, and 1.28 on 4024 paper/wire side). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.37 and the optical density of the sheet soaked in water for 2 minutes was 1.15. No clogging of the printhead was observed during the extensive print tests.

EXAMPLE XI

Red Ink

An ink composition was prepared as follows. To 91 milliliters of deionized water was added 1.64 grams of a polyethylene oxide-polypropylene oxide-polyethylene oxide block copolymer (Pluronic F-68, obtained from BASF) and the resulting dispersion was stirred at room temperature for 2 hours. Thereafter, 9.02 milliliters of 11.09 Molar aqueous ammonium hydroxide was added to the dispersion and the mixture was stirred for an additional hour at room temperature. Subsequently, a solution of 3.0 grams of Procion Yellow MX-8G dye (obtained from ICI) and 2.5 grams of Levafix Brilliant Red EGBA dissolved in 40 milliliters of water was added to the dispersion, and the mixture was stirred overnight at room temperature. The dispersion of colored polymeric micelles thus prepared was then diluted to 500 milliliters by the addition of deionized water and the excess unreacted dye was removed by ultrafiltration (Minitan System, available from Millipore, equipped with 2 100K polysulfone membranes). The purified suspension of red colored polymeric micelles was then concentrated to 85 milliliters by solvent evaporation in a Rotary evaporator under reduced pressure.

To this purified concentrated suspension of red colored polymeric micelles were then added 3.7 milliliters of ethylene glycol to form a red colored ink composition. The red ink thus prepared was incorporated into a cleaned Hewlett Packard ink cartridge and jetted with a Hewlett Packard Desk Jet ink jet printer. Prints were formed on plain paper (Xerox ® 4024 (#19) paper, obtained from Xerox Corporation), on silica coated paper (obtained from Jujo), and on transparency material (3R3351, obtained from Xerox Corporation). In each instance, the red prints obtained exhibited solid areas of acceptable optical density (1.09 on coated paper, 1.02 on 4024 paper/felt side, 0.65 on 4024 paper/wire side, and 0.98 on transparency). Feathering was minimal on both the felt side and the wire side of the uncoated paper. In addition, the prints of the 4024 plain paper exhibited excellent waterfastness, as determined by cutting a printed solid area on 4024 paper (wire side) into two sheets, soaking one sheet in water for 2 minutes, air drying the soaked sheets, and measuring the optical densities of both the soaked and unsoaked sheets. The optical density of the sheet that was not soaked in water was 1.02 and the optical density of the sheet soaked in water for 2 minutes was 0.85. No clogging of the printhead was observed during the extensive print tests. No clogging of the printhead was observed during the extensive print tests.

EXAMPLE XII

Fluorescent Silicated Ink

A. Preparation of a Reactive Fluorescent Dye

A Reactive fluorescent dye was prepared as follows. A solution of cyanuric chloride (9.96 grams, 54 millimoles, obtained from Eastman Kodak Chemicals) in acetone (50 milliliters) was added to vigorously stirred water (500 milliliters) at 5° C. To the resulting finely dispersed suspension was added dropwise a solution of 4,4'-diaminostilbene-2,2'-disulfonic acid, disodium salt (10.0 grams, 127 millimoles, prepared from 4,4'-diaminostilbene-2,2'-disulfonic acid (10.0 grams, obtained from Eastman Kodak Chemicals) and sodium hydroxide (2.174 grams)) in water (250 milliliters). The temperature of the reaction mixture was maintained at 5° C. throughout the addition. The pH of the reaction mixture was maintained at a value higher than 2 by portionwise addition of $Na_2CO_3$ (total amount added 4.08 grams). At the end of the addition, the reaction mixture was stirred at 5° C. for 30 minutes. Subsequently, sodium chloride (100 grams) was added to the mixture. The resulting solid was separated by filtration, washed with acetone, and dried in vacuo at 50° C. overnight to yield 15.7 grams of the product. The reaction scheme was as follows:

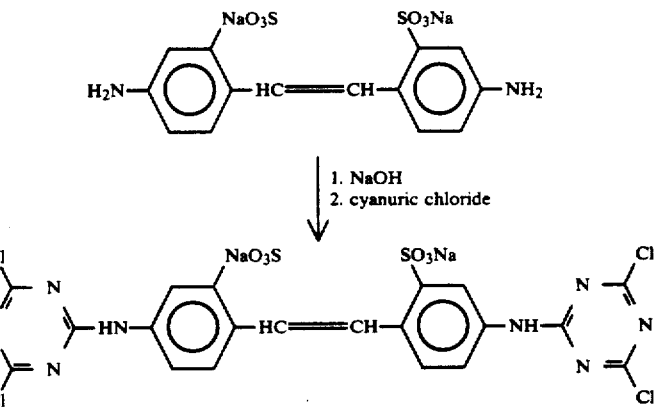

B. Preparation of Silicated Fluorescent Particles

To 1350 milliliters of deionized water was added 24.4 grams of a polyethylene oxide-polypropylene oxide-polyethylene oxide block copolymer (Pluronic F-68, obtained from BASF) and 6.2 milliliters of tetraethoxysilane, and the resulting dispersion was stirred vigorously at room temperature for 2 hours. Thereafter, 135 milliliters of 11 Molar aqueous ammonium hydroxide was added to the mixture and the mixture was stirred overnight at room temperature. Subsequently, a suspension of 1.0 gram of 4,4'-di-(4",6"-dichloro-2,4,6-triazin-2-yl)-aminostilbene-2,2'-disulfonic acid, disodium salt in 12.5 milliliters of water prepared as described in paragraph (A) of this Example was added to a 100 milliliter aliquot of the mixture containing the silicated aggregates, and the resulting mixture was stirred overnight at room temperature. Excess unreacted dye was removed by ultrafiltration (Minitan System from Millipore equipped with two 30K polysulfone membranes). The purified mixture was concentrated to 30 milliliters by evaporation of the water under vacuum at room temperature.

C. Preparation of a Fluorescent Ink

An ink composition was prepared by adding 1 milliliter of ethylene glycol to 9 milliliters of the slightly yellow highly fluorescent solution obtained in paragraph (B) of this Example. The resulting solution was filtered through a 0.45 micron filter to obtain an ink.

D. Printing Tests

The ink prepared as described in paragraph (C) of this Example was incorporated into a cleaned Hewlett Packard ink cartridge and jetted with a Hewlett Packard Desk Jet printer and prints were made on Xerox ® 4024 paper (#19, felt and wire side) and on Strathmore writing bond paper (25 percent cotton fiber), obtained from Strathmore Paper Company. In all instances, the prints obtained were invisible to the eye but were strongly fluorescent when examined under ultraviolet lamps emitting at either 254 nanometers or 366 nanometers. Extremely high contrast was observed for images printed on the bond paper (non-fluorescent paper). The contrast was lower for the images on the 4024 paper, which contains a fluorescent brightener, but the images were easily detectable. No feathering of the prints was observed on either the felt or the wire sides of the papers. Prints on both papers exhibited very high waterfastness, as exemplified by the following test: a printed solid area was cut in two parts, and one half was soaked in water for 2 minutes and subsequently air dried. The fluorescence emissions from both halves were measured with a SPEX fluorescence spectrometer. No decrease in fluorescence intensity was detected in the washed half compared to the untreated half.

EXAMPLE XIII

Colored Inks Containing Fluorescent Silicated Particles

A. Preparation of Silicated Fluorescent Particles

To 1350 milliliters of deionized water was added 24.4 grams of a polyethylene oxide-polypropylene oxide-polyethylene oxide block copolymer (Pluronic F-68, obtained from BASF) and 6.2 milliliters of tetraethoxysilane, and the resulting dispersion was stirred vigorously at room temperature for 2 hours. Thereafter, 135 milliliters of 11 Molar aqueous ammonium hydroxide was added to the mixture and the mixture was stirred overnight at room temperature. Subsequently, a suspension of 8.0 grams of 4,4'-di-(4",6"-dichloro-2,4,6-triazin-2-yl)-aminostilbene-2,2'-disulfonic acid, disodium salt in 100 milliliters of water prepared as described in paragraph (A) of Example XII was added to an 800 milliliter aliquot of the mixture containing the silicated aggregates, and the resulting mixture was stirred overnight at room temperature. Excess unreacted dye was removed by ultrafiltration (Minitan System from Millipore equipped with two 30K polysulfone membranes), and the fluorescent particles were isolated by freeze drying, resulting in a slightly yellow highly fluorescent free flowing powder (11.8 grams, containing about 9.5 percent by weight of the fluorescent dye, from UV absorption at 342 nanometers, using 4,4'-diaminostilbene-2,2'-disulfonic acid, disodium salt as a model compound).

B. Preparation of a Magenta Ink Containing Silicated Fluorescent Particles

A magenta ink was prepared by mixing together 35.0 grams of Projet Magenta dye, obtained from ICI Americas, Inc., 0.51 gram of pyrazole, obtained from Aldrich Chemical Company, 1.07 grams of Discole N-506, obtained from Daiichi Kogyo Seiyaku Corporation, and 69.53 grams of distilled water. To 9.0 milliliters of this ink was added 0.50 gram of the fluorescent particles prepared as described in paragraph (A) of this Example, and the resulting mixture was stirred for two hours and then filtered through a 0.45 micron filter, resulting in a magenta ink containing fluorescent particles. For comparative purposes, a magenta ink of identical composition except that it contained no fluorescent particles was also prepared.

C. Preparation of a Cyan Ink Containing Silicated Fluorescent Particles

A cyan ink was prepared by mixing together 30.03 grams of Projet Cyan dye, obtained from ICI Americas, Inc., 0.46 gram of pyrazole, obtained from Aldrich Chemical Company, 1.0 gram of Discole N-506, obtained from Daiichi Kogyo Seiyaku Corporation, and 65.6 grams of distilled water. To 9.0 milliliters of this ink was added 0.50 gram of the fluorescent particles prepared as described in paragraph (A) of this Example, and the resulting mixture was stirred for two hours and then filtered through a 0.45 micron filter, resulting in a cyan ink containing fluorescent particles. For comparative purposes, a cyan ink of identical composition except that it contained no fluorescent particles was also prepared.

D. Printing Tests

The inks prepared as described in paragraphs (B) and (C) of this Example were incorporated into a cleaned Hewlett Packard ink cartridge and jetted with a Hewlett Packard Desk Jet printer and prints were made on Strathmore writing bond paper (25 percent cotton fiber), obtained from Strathmore Paper Company, and on Fuji Xerox L. paper, obtained from Fuji Xerox Company, Ltd. Under normal lighting conditions, the prints made with inks containing the fluorescent particles did not differ significantly from the prints made with inks of the same color containing no fluorescent particles, indicating that the fluorescent particles had no deleterious effect on print quality. When observed under ultraviolet light emitted at either 254 nanometers or at 366 nanometers, however, the prints made with inks containing the fluorescent particles were highly fluorescent, while the prints made with inks of the same color containing no fluorescent particles did not fluoresce at all. These results demonstrate that it is possible to detect the fluorescence of the tagged particles in the presence of large amounts of dyes. Extremely high contrast was observed for the fluorescent images. The prints made with inks containing the fluorescent particles also exhibited very high waterfastness, as exemplified by the following test: a printed solid area was cut in two parts, and one half was soaked in water for 2 minutes and subsequently air dried. The fluorescence emissions from both halves were measured with a SPEX fluorescence spectrometer and the optical density of both haves was measured with a Macbeth TR927 Densitometer. The results were as follows:

|  | Optical Density | | | Fluorescence Intensity | | |
|---|---|---|---|---|---|---|
| Ink | Before Wash | After Wash | % Residual | Before Wash | After Wash | % Residual |
| Magenta Fluorescent | 0.87 | 0.43 | 33 | $1.9 \times 10^5$ | $4.8 \times 10^5$ | 152.6 |

-continued

| Ink | Optical Density | | | Fluorescence Intensity | | |
|---|---|---|---|---|---|---|
| | Before Wash | After Wash | % Residual | Before Wash | After Wash | % Residual |
| Magenta Nonfluorescent | 1.27 | 0.42 | 49 | 0 | 0 | — |
| Cyan Fluorescent | 1.00 | 0.56 | 56 | $1.2 \times 10^5$ | $6.5 \times 10^5$ | 441.7 |
| Cyan Nonfluorescent | 1.12 | 0.61 | 54 | 0 | 0 | — |

EXAMPLE XIV

Fluorescent Ink

A. Preparation of Fluorescent Particles

To 1350 milliliters of deionized water was added 24.4 grams of a polyethylene oxide-polypropylene oxide-polyethylene oxide block copolymer (Pluronic F-68, obtained from BASF) and the resulting dispersion was stirred vigorously at room temperature for 2 hours. Thereafter, 135 milliliters of 11 Molar aqueous ammonium hydroxide was added to the mixture and the mixture was stirred overnight at room temperature. Subsequently, a suspension of 1.0 gram of 4,4'-di-(4",6"-dichloro-2,4,6-triazin-2-yl)-aminostilbene-2,2'-disulfonic acid, disodium salt in 12.5 milliliters of water prepared as described in paragraph (A) of Example XII was added to a 100 milliliter aliquot of the mixture containing the aggregates, and the resulting mixture was stirred overnight at room temperature. Excess unreacted dye was removed by ultrafiltration (Minitan System from Millipore equipped with two 30K polysulfone membranes). The purified mixture was concentrated to 30 milliliters by evaporation of the water under vacuum at room temperature.

B. Preparation of a Fluorescent Ink

An ink composition was prepared by adding 1 milliliter of ethylene glycol to 9 milliliters of the slightly yellow highly fluorescent solution obtained in paragraph (A) of this Example. The resulting solution was filtered through a 0.45 micron filter to obtain an ink.

C. Printing Tests

The ink prepared as described in paragraph (B) of this Example was incorporated into a cleaned Hewlett Packard ink cartridge and jetted with a Hewlett Packard Desk Jet printer and prints were made on Xerox ® 4024 paper (#19, felt and wire side), available from Xerox Corporation, and on Strathmore writing bond paper (25 percent cotton fiber), obtained from Strathmore Paper Company. In all instances, the prints obtained were invisible to the eye but were strongly fluorescent when examined under ultraviolet lamps emitting at either 254 nanometers or 366 nanometers. Extremely high contrast was observed for images printed on the bond paper (non-fluorescent paper). The contrast was lower for the images on the 4024 paper, which contains a fluorescent brightener, but the images were easily detectable. No feathering of the prints was observed on either the felt or the wire sides of the papers. Prints on both papers exhibited very high waterfastness, as exemplified by the following test: a printed solid area was cut in two parts, and one half was soaked in water for 2 minutes and subsequently air dried. The fluorescence emissions from both halves were measured with a SPEX fluorescence spectrometer. No decrease in fluorescence intensity was detected in the washed half compared to the untreated half.

EXAMPLE XV

Fluorescent Ink

A. Preparation of Fluorescent Particles

To 1350 milliliters of deionized water was added 24.4 grams of a polyethylene oxide-polypropylene oxide-polyethylene oxide block copolymer (Pluronic F-68, obtained from BASF) and the resulting dispersion was stirred vigorously at room temperature for 2 hours. Thereafter, 135 milliliters of 11 Molar aqueous ammonium hydroxide was added to the mixture and the mixture was stirred overnight at room temperature. Subsequently, a suspension of 8.0 grams of 4,4'-di-(4",6"-dichloro-2,4,6-triazin-2-yl)-aminostilbene-2,2'-disulfonic acid, disodium salt in 100 milliliters of water prepared as described in paragraph (A) of Example XII was added to an 800 milliliter aliquot of the mixture containing the aggregates, and the resulting mixture was stirred overnight at room temperature. Excess unreacted dye was removed by ultrafiltration (Minitan System from Millipore equipped with two 30K polysulfone membranes), and the fluorescent particles were isolated by freeze drying, resulting in a slightly yellow highly fluorescent free flowing powder (10.2 grams, containing about 10.2 percent by weight of the fluorescent dye, from UV absorption at 342 nanometers, using 4,4'-diaminostilbene-2,2'-disulfonic acid, disodium salt as a model compound).

B. Preparation of a Magenta Ink Containing Fluorescent Particles

A magenta ink was prepared by mixing together 35.0 grams of Projet Magenta dye, obtained from ICI Americas, Inc., 0.51 gram of pyrazole, obtained from Aldrich Chemical Company, 1.07 grams of Discole N-506, obtained from Daiichi Kogyo Seiyaku Corporation, and 69.53 grams of distilled water. To 9.0 milliliters of this ink was added 0.50 grams of the fluorescent particles prepared as described in paragraph (A) of this Example, and the resulting mixture was stirred for two hours and then filtered through a 0.45 micron filter, resulting in a magenta ink containing fluorescent particles. For comparative purposes, a magenta ink of identical composition except that it contained no fluorescent particles was also prepared.

C. Printing Tests

The ink prepared as described in paragraph (B) of this Example was incorporated into a cleaned Hewlett Packard ink cartridge and jetted with a Hewlett Packard Desk Jet printer and prints were made on Strathmore writing bond paper (25 percent cotton fiber), obtained from Strathmore Paper Co, on Fuji Xerox L. paper, obtained from Fuji Xerox Company, Ltd. Under normal lighting conditions, the prints made with inks containing the fluorescent particles did not differ significantly from the prints made with a magenta ink containing no fluorescent particles, indicating that the fluorescent particles had no deleterious effect on print quality. When observed under ultraviolet light emitted at either 254 nanometers or at 366 nanometers, however, the prints made with the ink containing the fluorescent particles were highly fluorescent, while the prints made with inks of the same color containing no fluorescent particles did not fluoresce at all. These results demonstrate that it is possible to detect the fluorescence of the tagged particles in the presence of large amounts of dyes. Extremely high contrast and waterfastness were observed for the fluorescent images.

EXAMPLE XVI

Fluorescent Silicated Ink

A. Preparation of a Reactive Fluorescent Dye

A Reactive fluorescent dye was prepared as follows. A solution of cyanuric chloride (0.54 grams 2.9 millimoles, obtained from Eastman Kodak Chemicals) in acetone (3 milliliters) was added to vigorously stirred water (100 milliliters) containing sodium carbonate (0.62 gram, 5.85 millimoles, obtained from Fisher Chemicals), dansyl lysine (1.003 grams, 2.64 millimoles, obtained from Molecular Probes) and sodium hydroxide (0.2 gram) at 5° C. The temperature of the reaction mixture was maintained at 5° C. throughout the addition. At the end of the addition, the reaction mixture was stirred at 5° C. for two hours. Subsequently, the reaction mixture was cooled to 0° C. and hydrochloric acid (1 milliliter, 10%) was added to the mixture. The resulting solid was separated by filtration, washed twice with ice cold water (15 milliliters), and dried in vacuo at 50° C. overnight to yield 1.4 grams of the product. The reaction scheme was as follows:

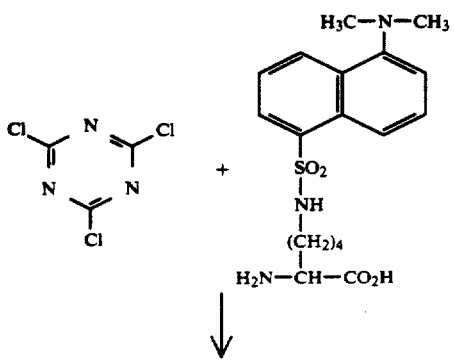

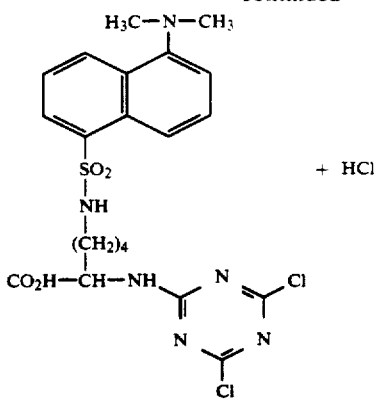

B. Preparation of Silicated Fluorescent Particles

To 1350 milliliters of deionized water was added 24.4 grams of a polyethylene oxide-polypropylene oxide-polyethylene oxide block copolymer (Pluronic F-68, obtained from BASF) and 6.2 milliliters of tetraethoxysilane, and the resulting dispersion was stirred vigorously at room temperature for 2 hours. Thereafter, 135 milliliters of 11 Molar aqueous ammonium hydroxide was added to the mixture and the mixture was stirred overnight at room temperature. Subsequently, a suspension of 0.99 gram of N-(4,6'-dichloro-3,4,5-triazin-2-yl)-N-ε-(5"-dimethylamino-1"-naphthalene sulfonyl)-lysine in 12.5 milliliters of water prepared as described in paragraph (A) of this Example was added to a 100 milliliter aliquot of the mixture containing the silicated aggregates, and the resulting mixture was stirred overnight at room temperature. Excess unreacted dye was removed by ultrafiltration (Minitan System from Millipore equipped with two 30K polysulfone membranes). The purified mixture was concentrated to 30 milliliters by evaporation of the water under vacuum at room temperature. The fluorescent particles were isolated by freeze drying, resulting in a slightly yellow highly fluorescent free-flowing powder (1.64 grams, containing about 29 percent by weight of the fluorescent dye, from UV absorption at 329 nanometers, using danyl lysine as a model compound).

C. Preparation of a Fluorescent Ink

An ink composition was prepared by adding 1 milliliter of ethylene glycol to 9 milliliters of water containing 0.5 gram of the slightly yellow highly fluorescent particles obtained as described in paragraph (B) of this Example. The resulting solution was filtered through a 0.45 micron filter to obtain an ink.

D. Printing Tests

The ink prepared as described in paragraph (C) of this Example was incorporated into a cleaned Hewlett Packard ink cartridge and jetted with a Hewlett Packard Desk Jet printer and prints were made on Xerox ® 4024 paper (#19, felt and wire side), available from Xerox Corporation, and on Strathmore writing bond paper (25 percent cotton fiber), obtained from Strathmore Paper Company. In all instances, the prints obtained were invisible to the eye but were strongly fluorescent when examined under ultraviolet lamps emitting at either 254 nanometers or 366 nanometers. Extremely high contrast was observed for images printed on the bond paper (non-fluorescent paper). The contrast was lower for the images on the 4024 paper, which contains a fluorescent brightener, but the images were easily detectable. No feathering of the prints was observed on either the felt or the wire sides of the papers. Prints on both papers exhibited very high waterfastness, as exemplified by the following test: a printed solid area was cut in two parts, and one half was soaked in water for 2 minutes and subsequently air dried. The fluorescence emissions from both halves were measured with a SPEX fluorescence spectrometer. No decrease in fluorescence intensity was detected in the washed half compared to the untreated half.

EXAMPLE XVII

Red Ink Containing Fluorescent Particles

A red ink composition is prepared as described in Example XI. To the ink thus prepared is added 80 milliliters of a solution of fluorescent particles prepared as described in part (A) of Example XIV. The resulting mixture is stirred to obtain a homogeneous solution, resulting in an ink containing red particles and substantially colorless fluorescent particles.

EXAMPLE XVIII

Cyan Ink Containing Fluorescent Silicated Particles

A cyan ink composition is prepared as described in Example I. To the ink thus prepared is added 80 milliliters of a solution of fluorescent silicated particles prepared as described in part (B) of Example XII. The resulting mixture is stirred to obtain a homogeneous solution, resulting in an ink containing cyan particles and substantially colorless fluorescent silicated particles.

EXAMPLE XIX

Magenta Silicated Ink Containing Fluorescent Particles

A magenta silicated ink composition is prepared as described in Example IV. To 9.0 milliliters of the ink thus prepared is added 0.50 gram of fluorescent particles prepared as described in part (A) of Example XV. The resulting mixture is stirred to obtain a homogeneous solution, resulting in an ink containing magenta silicated particles and substantially colorless fluorescent particles.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are convalently attached to the micelles, said dye molecules being detectable when exposed to radiation outside the visible wavelength range, wherein the A segments exhibit a solubility in water of at least about 0.2 gram per milliliter and the B segment exhibits a solubility in water of no more than about 0.01 gram per milliliter.

2. An ink composition according to claim 1 wherein the dye molecules are substantially colorless.

3. An ink composition according to claim 1 wherein the dye molecules are detectable when exposed to infrared radiation.

4. An ink composition according to claim 1 wherein the dye molecules are detectable when exposed to ultraviolet radiation.

5. An ink composition according to claim 1 wherein the ink also contains colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being colored and detectable in the visible wavelength range.

6. An ink composition according to claim 5 wherein the colored dye detectable in the visible wavelenght range is selected from the group consisting of Reactive Dyes.

7. An ink composition according to claim 1 wherein the ink also contains colored particles of an average diameter of 100 nanometers or less which comprise micelles of block copolymers of the formula ABA having silica precipitated therein, wherein A represents a hydrophilic segment and B represents a hydrophobic segment, and wherein dye molecules are covalently attached to the micelles, said dye molecules being colored and detectable in the visible wavelength range.

8. An ink composition according to claim 1 wherein the ink also contains a colorant detectable in the visible wavelength range selected from the group consisting of pigments, dyes, and mixtures thereof.

9. An ink composition according to claim 1 wherein the liquid vehicle comprises a mixture of water and a water-miscible organic component.

10. An ink composition according to claim 9 wherein the water-miscible organic component is selected from the group consisting of ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, monoalkyl ethers of ethylene glycol, dialkyl ethers of ethylene glycol, monoalkyl ethers of diethylene glycol, dialkyl ethers of diethylene glycol, ether derivatives, amino alcohols, ketones, and mixtures thereof.

11. An ink composition according to claim 1 wherein the A segments of the block copolymers are of monomers selected from the group consisting of oxyethylenes, aminoethylenes, vinyl carboxylic acids and their corresponding esters of the general formula:

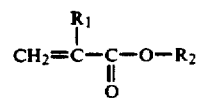

wherein $R_1$ and $R_2$ are independently selected from hydrogen and alkyl groups with from 1 to about 20 carbon atoms, oxazolines of the general formula

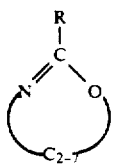

wherein R is hydrogen, an alkyl group with from 1 to about 6 carbon atoms, or benzyl and the ring has from about 2 to about 7 carbon atoms in addition to the carbon atom situated between the nitrogen and oxygen atoms, acrylamides of the general formula

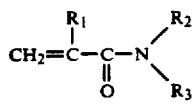

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, and amino-substituted alkyl groups, vinyl ethers of the general formula

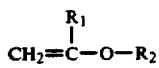

wherein $R_1$ is selected from the group consisting of hydrogen, methyl, and ethyl, and $R_2$ is selected from hydroxy-substituted alkyl groups and amino-substituted alkyl groups, and mixtures thereof.

12. An ink composition according to claim 1 wherein the B segment of the block copolymers is of monomers selected from the group consisting of oxypropylenes, vinyl monomers, acrylic monomers and esters of monocarboxylic acids, olefins, and mixtures thereof.

13. An ink composition according to claim 1 wherein the block copolymers are selected from the group consisting of ABA block copolymers wherein the A blocks are polyethylene oxide and the B block is polypropylene oxide, ABA block copolymers wherein the A blocks are 2-hydroxyethyl vinylether polymers and the B block is a polymer of butyl vinyl ether, ABA block copolymers wherein the A blocks are polyethylene oxide and the B block is a polymer of 2-hydroxyethyl methacrylate, and mixtures thereof.

14. An ink composition according to claim 1 wherein the particles are present in the liquid vehicle in an amount of from about 0.5 to about 15 percent by weight.

15. An ink composition which comprises an aqueous liquid vehicle and particles of an average diameter of 100 nanometers or less which comprise micelles of block copolymers of the formula ABA having silica precipitated therein, wherein A represents a hydrophilic segment and B represents a hydrophobic segment, and dye molecules covalently attached to the micelles, said dye molecules being detectable when exposed to radiation outside the visible wavelength range, wherein the A segments exhibit a solubility in water of at least about 0.2 gram per milliliter and the B segment exhibits a solubility in water of no more than about 0.01 gram per milliliter.

16. An ink composition according to claim 15 wherein the dye molecules are substantially colorless.

17. An ink composition according to claim 15 wherein the dye molecules are detectable when exposed to infrared radiation.

18. An ink composition according to claim 15 wherein the dye molecules are detectable when exposed to ultraviolet radiation.

19. An ink composition according to claim 15 wherein the silica is contained in the micelles in an amount of from about 1.5 to about 39.5 percent by weight.

20. An ink composition according to claim 15 wherein the ink also contains colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being colored and detectable in the visible wavelength range.

21. An ink composition according to claim 15 wherein the ink also contains colored particles of an average diameter of 100 nanometers or less which comprise micelles of block copolymers of the formula ABA having silica precipitated therein, wherein A represents a hydrophilic segment and B represents a hydrophobic segment, and wherein dye molecules are covalently attached to the micelles, said dye molecules being colored and detectable in the visible wavelength range.

22. An ink composition according to claim 15 wherein the ink also contains a colorant detectable in the visible wavelength range selected from the group consisting of pigments, dyes, and mixtures thereof.

23. In a printing process which comprises (1) incorporating into an ink jet printing apparatus an ink composition and (2) causing droplets of the ink to be ejected in an imagewise pattern onto a substrate, thereby generating images on the substrate, the improvement which comprises incorporating into the ink jet printing apparatus and jetting droplets onto the substrate an ink composition which comprises a liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range, wherein the A segments exhibit a solubility in water of at least about 0.2 gram per milliliter and the B segment exhibits a solubility in water of no more than about 0.01 gram per milliliter.

24. A printing process according to claim 23 wherein the dye molecules are substantially colorless.

25. A printing process according to claim 23 wherein the dye molecules are detectable when exposed to infrared radiation.

26. A printing process according to claim 23 wherein the dye molecules are detectable when exposed to ultraviolet radiation.

27. A printing process according to claim 23 wherein the micelles have silica precipitated therein.

28. A printing process according to claim 23 wherein the ink jet printing apparatus employs a thermal ink jet printing process.

29. A printing process according to claim 28 wherein the micelles have silica precipitated therein.

30. A printing process according to claim 23 wherein the ink also contains a colorant detectable in the visible wavelength range.

31. An ink composition which comprises an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles, wherein the A segments exhibit a solubility in water of at least about 0.2 gram per milliliter and the B segment exhibits a solubility in water of no more than about 0.01 gram per milliliter.

32. An ink composition according to claim 31 wherein the liquid vehicle comprises a mixture of water and a water-miscible organic component.

33. An ink composition according to claim 32 wherein the water-miscible organic component is selected from the group consisting of ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, monoalkyl ethers of ethylene glycol, dialkyl ethers of ethylene glycol, monoalkyl ethers of diethylene glycol, dialkyl ethers of diethylene glycol, ether derivatives, amino alcohols, ketones, and mixtures thereof.

34. An ink composition according to claim 31 wherein the A segments of the block copolymers are of monomers selected from the group consisting of oxyethylenes, aminoethylenes, vinyl carboxylic acids and their corresponding esters of the general formula:

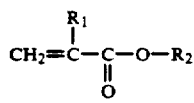

wherein $R_1$ and $R_2$ are independently selected from hydrogen and alkyl groups with from 1 to about 20 carbon atoms, oxazolines of the general formula

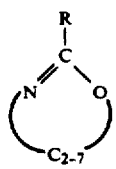

wherein R is hydrogen, an alkyl group with from 1 to about 6 carbon atoms, or benzyl and the ring has from about 2 to about 7 carbon atoms in addition to the carbon atom situated between the nitrogen and oxygen atoms, acrylamides of the general formula

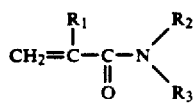

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, and aminosubstituted alkyl groups, vinyl ethers of the general formula

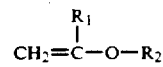

wherein $R_1$ is selected from the group consisting of hydrogen, methyl, and ethyl, and $R_2$ is selected from hydroxy-substituted alkyl groups and amino-substituted alkyl groups, and mixtures thereof.

35. An ink composition according to claim 31 wherein the B segment of the block copolymers is of monomers selected from the group consisting of oxypropylenes, vinyl monomers, acrylic monomers and esters of monocarboxylic acids, olefins, and mixtures thereof.

36. An ink composition according to claim 31 wherein the block copolymers are selected from the group consisting of ABA block copolymers wherein the A blocks are polyethylene oxide and the B block is polypropylene oxide, ABA block copolymers wherein the A blocks are 2-hydroxyethyl vinylether polymers and the B block is a polymer of butyl vinyl ether, ABA block copolymers wherein the A blocks are polyethylene oxide and the B block is a polymer of 2-hydroxyethyl methacrylate, and mixtures thereof.

37. An ink composition according to claim 31 wherein the dye molecules are selected from the group consisting of Reactive Dyes.

38. An ink composition according to claim 31 wherein the colored particles are present in the liquid vehicle in an amount of from about 0.5 to about 15 percent by weight.

39. An ink composition which comprises an aqueous liquid vehicle and colored particles of an average diameter of 100 nanometers or less which comprise micelles of block copolymers of the formula ABA having silica precipitated therein, wherein A represents a hydrophilic segment and B represents a hydrophobic segment, and dye molecules covalently attached to the micelles, wherein the A segments exhibit a solubility in water of at least about 0.2 gram per milliliter and the B segment exhibits a solubility in water of no more than about 0.01 gram per milliliter.

40. An ink composition according to claim 39 wherein the silica is contained in the micelles in an amount of from about 1.5 to about 39.5 percent by weight.

41. In a printing process which comprises (1) incorporating into an ink jet printing apparatus an ink composition and (2) causing droplets of the ink to be ejected in an imagewise pattern onto a substrate, thereby generating images on the substrate, the improvement which comprises incorporating into the ink jet printing apparatus and jetting droplets onto the substrate an ink composition which comprises a liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles, wherein the A segments exhibit a solubility in water of at least about 0.2 gram per milliliter and the B segment exhibits a solubility in water of no more than about 0.01 gram per milliliter.

42. A printing process according to claim 41 wherein the micelles have silica precipitated therein.

43. A printing process according to claim 41 wherein the ink jet printing apparatus employs a thermal ink jet printing process.

44. A printing process according to claim 43 wherein the micelles have silica precipitated therein.

45. An ink preparation process which comprises, in the order stated (1) adding to water a block copolymer of the formula ABA, wherein A represents a hydrophilic segment and B represents a hydrophobic segment, wherein the A segments exhibit a solubility in water of at least about 0.2 gram per milliliter and the B segment exhibits a solubility in water of no more than about 0.01 gram per milliliter, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition.

46. A process according to claim 45 wherein the A segments of the block copolymers are of monomers selected from the group consisting of oxyethylenes, aminoethylenes, vinyl carboxylic acids and their corresponding esters of the general formula:

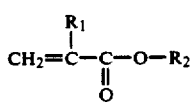

wherein $R_1$ and $R_2$ are independently selected from hydrogen and alkyl groups with from 1 to about 20 carbon atoms, oxazolines of the general formula

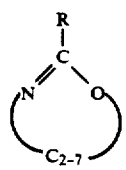

wherein R is hydrogen, an alkyl group with from 1 to about 6 carbon atoms, or benzyl and the ring has from about 2 to about 7 carbon atoms in addition to the carbon atom situated between the nitrogen and oxygen atoms, acrylamides of the general formula

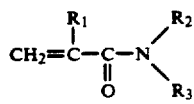

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, and amino-substituted alkyl groups, vinyl ethers of the general formula

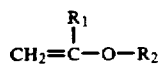

wherein $R_1$ is selected from the group consisting of hydrogen, methyl, and ethyl, and $R_2$ is selected from hydroxy-substituted alkyl groups and amino-substituted alkyl groups, and mixtures thereof.

47. A process according to claim 45 wherein the B segment of the block copolymers is of monomers selected from the group consisting of oxypropylenes, vinyl monomers, acrylic monomers and esters of monocarboxylic acids, olefins, and mixtures thereof.

48. A process according to claim 45 wherein the block copolymers are selected from the group consisting of ABA block copolymers wherein the A blocks are polyethylene oxide and the B block is polypropylene oxide, ABA block copolymers wherein the A blocks are 2-hydroxyethyl vinylether polymers and the B block is a polymer of butyl vinyl ether, ABA block copolymers wherein the A blocks are polyethylene oxide and the B block is a polymer of 2-hydroxyethyl methacrylate, and mixtures thereof.

49. A process according to claim 45 wherein the water soluble base is selected from the group consisting of ammonium hydroxide, sodium hydroxide, methyl amine, ethyl amine, propyl amine, and mixtures thereof.

50. A process according to claim 45 wherein the water soluble base is added to the dispersion in an amount of from about 5 to about 20 percent by weight of the dispersion.

51. A process according to claim 45 wherein the dye is added to the dispersion in an amount of from about 5 to about 30 percent by weight of the micelles.

52. A process according to claim 45 wherein the colored micelles are purified by filtration prior to admixing with the liquid vehicle.

53. An ink preparation process which comprises, in the order stated (1) adding to water a block copolymer of the formula ABA, wherein A represents a hydrophilic segment and B represents a hydrophobic segment, wherein the A segments exhibit a solubility in water of at least about 0.2 gram per milliliter and the B segment exhibits a solubility in water of no more than about 0.01 gram per milliliter, thereby forming a dispersion of micelles of the block copolymer; (2) admixing a tetraalkoxysilane with the dispersion; (3) adding a water-soluble base to the dispersion, thereby bringing the pH of the dispersion to at least 8, thereby precipitating silica within the micelles; (4) adding to the dispersion a solution comprising water and a reactive dye capable of reacting with the block copolymer, thereby forming colored polymeric micelles with silica precipitated therein; and (5) admixing the colored micelles with a liquid vehicle to form an ink composition.

54. A process according to claim 53 wherein alkoxy groups of the tetraalkoxysilane have from 1 to about 6 carbon atoms.

55. A process according to claim 53 wherein the tetraalkoxysilane is selected from the group consisting of tetraethoxysilane, tetramethoxysilane, tetra-n-propoxysilane, tetra-i-propoxysilane, tetra-n-butoxysilane, tetra-s-butoxysilane, tetra-i-butoxysilane, tetrapentoxysilane, tetrakis-(2-methoxyethoxysilane), and mixtures thereof.

56. A process according to claim 53 wherein the tetraalkoxysilane is added to the dispersion in an amount of from about 1 to about 30 percent by weight of the micelles.

* * * * *